(12) United States Patent
Hantrakul et al.

(10) Patent No.: US 12,198,673 B2
(45) Date of Patent: Jan. 14, 2025

(54) DIFFERENTIABLE WAVETABLE SYNTHESIZER USING PLURALITY OF MACHINE LEARNING MODELS TO REDUCE COMPUTATIONAL COMPLEXITY OF AUDIO SYNTHESIS

(71) Applicant: LEMON INC., Grand Cayman (KY)

(72) Inventors: Lamtharn Hantrakul, Singapore (SG); Siyuan Shan, Los Angeles, CA (US); Jitong Chen, Los Angeles, CA (US); Matthew David Avent, London (GB); David Trevelyan, London (GB)

(73) Assignee: LEMON INC., Grand Cayman (KY)

( * ) Notice: Subject to any disclaimer, the term of this patent is extended or adjusted under 35 U.S.C. 154(b) by 357 days.

(21) Appl. No.: 17/525,814

(22) Filed: Nov. 12, 2021

(65) Prior Publication Data

US 2023/0154451 A1  May 18, 2023

(51) Int. Cl.
*G10L 13/04* (2013.01)
*G06N 20/00* (2019.01)
(Continued)

(52) U.S. Cl.
CPC .............. *G10L 13/04* (2013.01); *G06N 20/00* (2019.01); *G10H 7/105* (2013.01); *G10L 13/047* (2013.01);
(Continued)

(58) Field of Classification Search
USPC .................................................. 704/254, 258
See application file for complete search history.

(56) References Cited

U.S. PATENT DOCUMENTS 11,790,884 B1 * 10/2023 Shakeri ................. G10L 13/047
704/258
2014/0088968 A1 * 3/2014 Chen ....................... G10L 15/04
704/254
(Continued)

FOREIGN PATENT DOCUMENTS

JP        2001-005475 A       1/2001
WO    WO 2020063148      *   4/2020

OTHER PUBLICATIONS

International Patent Application No. PCT/SG2022/050795; Int'l Search Report; dated Jun. 2, 2023; 3 pages.
(Continued)

*Primary Examiner* — Farzad Kazeminezhad
(74) *Attorney, Agent, or Firm* — BakerHostetler

(57) ABSTRACT

The present disclosure describes techniques for differentiable wavetable synthesizer. The techniques comprise extracting features from a dataset of sounds, wherein the features comprise at least timbre embedding; input the features to the first machine learning model, wherein the first machine learning model is configured to extract a set of N×L learnable parameters, N represents a number of wavetables, and L represents a wavetable length; outputting a plurality of wavetables, wherein each of plurality of wavetables comprises a waveform associated with a unique timbre, the plurality of wavetables form a dictionary, and the plurality of wavetables are portable to perform audio-related tasks. Finally, the said wavetables are used to initialize another machine learning model so as to help reduce computational complexity of an audio synthesis obtained as output of the another machine learning model.

20 Claims, 11 Drawing Sheets

(51) Int. Cl.
  *G10H 7/10* (2006.01)
  *G10L 13/047* (2013.01)
  *G10L 13/08* (2013.01)
  *G10L 15/04* (2013.01)
  *G10L 19/26* (2013.01)

(52) U.S. Cl.
  CPC .............. *G10L 13/08* (2013.01); *G10L 15/04* (2013.01); *G10L 19/26* (2013.01)

(56) References Cited

U.S. PATENT DOCUMENTS

| | | | |
|---|---|---|---|
| 2018/0174571 A1* | 6/2018 | Tamura | G10L 13/047 |
| 2021/0217396 A1* | 7/2021 | Sobierajski | G10H 1/06 |
| 2022/0013132 A1* | 1/2022 | Engel | G10L 19/26 |
| 2023/0018384 A1* | 1/2023 | Finkelstein | G10L 13/08 |

OTHER PUBLICATIONS

Hadjakos; "Gaussian Process Synthesis of Artificial Sounds"; Applied Sciences; vol. 10; 2020; 13 pages.

Oord et al.; "WaveNet: A Generative Model for Raw Audio"; CoRR Machine Learning; arXiv:1609.03499; 2016; 15 pages.

Wang et al.; "Tacotron: Towards End-to-End Speech Synthesis"; CoRR Machine Learning; arXiv:1703.10135; 2017; 10 pages.

Kalchbrenner et al.; "Efficient Neural Audio Synthesis"; $35^{th}$ Int'l Conf. on Machine Learning; vol. 80; 2018; p. 2410-2419.

Ren et al.; "FastSpeech 2: Fast and High-Quality End-to-End Text to Speech"; Audio and Speech Processing; 2021; 15 pages.

Engel et al.; "DDSP: Differentiable Digital Signal Processing"; Machine Learning; arXiv:2001:04643; 2020; 19 pages.

Ganis et al.; "Real-time Timbre Transfer and Sound Synthesis using DDSP"; CoRR Sound; arXiv:2103.07220; 2021; 11 pages.

Kuznetsov et al.; "Differentiable IIR filters for machine learning applications"; $23^{rd}$ Int'l Conf. on Digital Audio Effects; 2020; p. 297-303.

Bristow-Johnson; "Wavetable Synthesis 101, a Fundamental Perspective"; Audio Engineering Society Convention; 1996; 27 pages.

Horner et al.; "Instrument Modeling and Synthesis"; Signal Processing in Acoustics; 2008; p. 375-397 (abstract only).

Graves et al.; "Neural Turing Machines"; Neural and Evolutionary Computing; 2014; 26 pages.

Graves et al.; "Hybrid computing using a neural network with dynamic external memory"; Nature; vol. 538; 2016; 21 pages.

Shan et al.; "Meta-Neighborhoods"; Advances in Neural Information Processing Systems; vol. 33; 2020; p. 5047-5057.

Engel et al.; "Self-supervised Pitch Detection by Inverse Audio Synthesis"; ICML Worshop SAS; 2020; 9 pages.

Lee et al.; "Differentiable Artificial Reverberation"; CoRR Audio and Speech Processing; arXiv:2105.13940; 2021; 14 pages.

Horner et al.; "Methods for Multiple Wavetable Synthesis of Musical Instrument Tones"; J. Audio Eng. Soc.; vol. 41 No. 5; May 1993; p. 336-356.

Horner et al.; "Wavetable Matching Synthesis of Dynamic Instruments with Genetic Algorithm"; Journal of the Audio Engineering Society; vol. 43; Nov. 1995; 17 pages.

Kim et al.; "Crepe: A Convolutional Representation for Pitch Estimation"; IEEE Int'l Conf. on Acoustics, Speech and Signal Processing; 2018; p. 161-165.

Hantrakul et al.; "Fast and Flexible Neural Audio Synthesis"; 20th ISMR Conf.; 2019; p. 524-530.

Engel et al.; "GANSynth: Adversarial Neural Audio Synthesis"; CoRR Machine Learning; arXiv:1902.08710; 2019; 17 pages.

Richard et al.; "Neural Synthesis of Binaural Speech From Mono Audio"; Int'l Conf. on Learning Representation; 2020; 23 pages.

Mikolov et al.; "Distributed representations of words and phrases and their compositionality"; Advances in Neural Information Processing Systems; 2013; p. 3111-3119.

Zhu et al.; "Incorporating BERT into Neural Machine Translation"; CoRR Computation and Language; arXiv:2002.06823; 2020; 18 pages.

Li et al.; "Creating a Multitrack Classical Music Performance Dataset for Multimodal Music Analysis: Challenges, Insights, and Applications"; IEEE Transactions on Multimedia; vol. 21; Feb. 2019; p. 522-535.

Charpentier et al.; "Diphone synthesis using an overlap-add technique for speech waveforms concatenation"; IEEE Int'l Conf. on Acoustics, Speech, and Signal Processing; Apr. 1986; (abstract only).

\* cited by examiner

| DDSP Additive Synthesis | Wavetable Synthesis (Ours) with $N=$ | | | |
|---|---|---|---|---|
| | 5 | 10 | 20 | 100 |
| 0.5834 ± 0.0035 | 0.6448 ± 0.0041 | 0.5989 ± 0.0042 | 0.5712 ± 0.0037 | 0.5756 ± 0.0034 |

FIG. 8

DIFFERENTIABLE WAVETABLE SYNTHESIZER USING PLURALITY OF MACHINE LEARNING MODELS TO REDUCE COMPUTATIONAL COMPLEXITY OF AUDIO SYNTHESIS

BACKGROUND

Techniques of audio synthesis are widely used in music, filmmaking, and entertainment industries. Traditional audio synthesis utilizes digital signal processing principles and has played an important role in the development of audio synthesis. However, conventional audio synthesis may not fulfil needs of users due to various limitations. Therefore, improvements in audio synthesis are needed.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 8 illustrates an example table depicting the varying performance of different models.

DETAILED DESCRIPTION OF ILLUSTRATIVE EMBODIMENTS

The present disclosure provides a differentiable wavetable synthesizer (DWTS). The DWTS learns a dictionary of one-period waveforms (i.e., wavetables) through end-to-end training. The DWTS utilizes a machine learning model to extract fundamental wavetables that accurately describe the audio data. The machine learning model may be trained using a gradient descent algorithm with a plurality of N×L learnable parameters. N represents a number of wavetables and L represents a wavetable length. Learned wavetables may form an explicit dictionary and may be portable to other audio-related tasks. Learned wavetables may replace the hand-crafted ones used in the conventional audio synthesis. Learned wavetables may be used to produce more natural sounding and expressive synthesized tones. Compared to an implicit multi-dimensional vector, wavetables have the benefit of being an explicit and interpretable representation.

Additionally, the extracted fundamental wavetables may be linearly weighted during real-time audio synthesis. A new machine learning model that is smaller and CPU friendly may be used to only output a linear combination of static wavetables when synthesizing audio. Compared to other neural audio synthesis techniques, the new machine learning model requires much fewer output control parameters. A significantly cheaper computation may be achieved.

Furthermore, the DWTS may provide capabilities of audio manipulations, such as high-quality pitch-shifting, using only a few seconds of input audio. The ability to sample audio and manipulate it (e.g., slow it down, speed it up, make it higher, make it lower) is at the heart of genres of music (e.g., hip hop) and electronic music. The DWTS may show an ability to manipulate a piano sample beyond conventional algorithms.

The DWTS has benefits of both traditional audio synthesis and neural audio synthesis. The DWTS produces high fidelity audio and state-of-the-art synthesis quality with as few as 10 to 20 wavetables. The DWTS also achieves improved performance by using learned wavetables for real-time and interactive audio synthesis. In addition, the DWTS has a much cheaper computation than competing synthesis approaches. Moreover, the DWTS demonstrates data-driven dictionary of waveforms opens up unprecedented one-shot learning paradigms on short audio clips.

Figure 1:
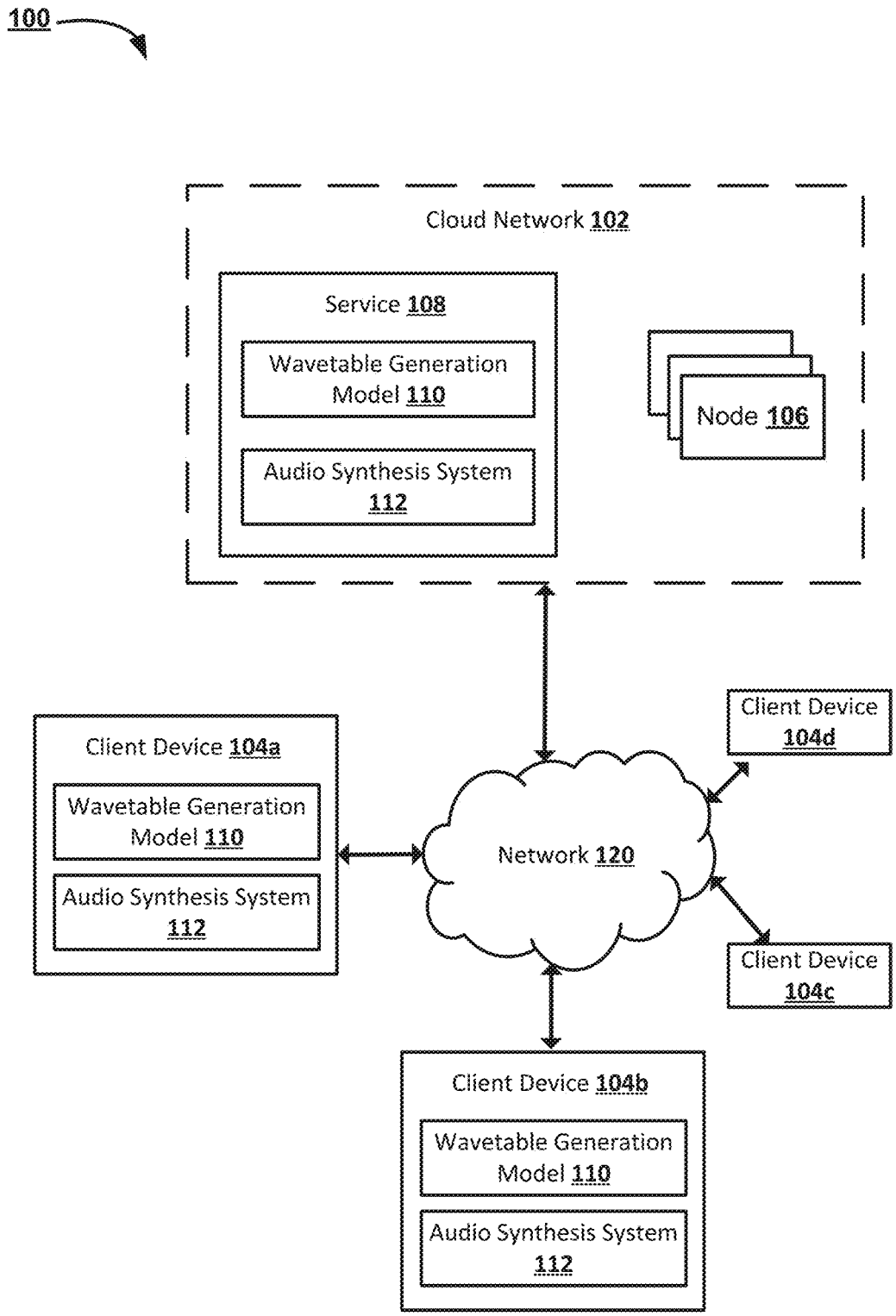
FIG. 1 illustrates an example system including a cloud service in accordance with the present disclosure.

FIG. 1 illustrates example components of a cloud computing system 100. By way of example and without limitation, cloud computing system 100 may be used to perform aspects of the disclosed subject matter. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and by other cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, and/or smartphone, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. By way of example and without limitation, a PC user device accessing a cloud-based application may not be aware that the PC downloads program logic and/or data from the cloud computing system, or that the PC offloads processing or storage functions to the cloud computing system, for example.

In FIG. 1, cloud computing system 100 may comprise a cloud network 102 and a plurality of client devices 104a-d. The cloud network 102 and the plurality of client devices 104a-d may communicate with each other via one or more networks 120.

The cloud network 102 may be located at a data center, such as a single premise, or be distributed throughout different geographic locations (e.g., at several premises). The cloud network 102 may provide service(s) via the one or more networks 120. The network 120 may comprise one or more public networks (e.g., the Internet) and/or one or more private networks. A private network may include a wireless local area network (WLAN), a local area network (LAN), a wide area network (WAN), a cellular network, or an intranet. The network 120 may comprise wired network(s) and/or wireless network(s). For example, the network 120 may comprise physical links, such as coaxial cable links, twisted pair cable links, fiber optic links, a combination thereof, and/or the like. As another example, the network 120 may comprise wireless links, such as cellular links, satellite links, Wi-Fi links and/or the like. The network 120 may comprise a variety of network devices, such as routers, switches, multiplexers, hubs, modems, bridges, repeaters, firewalls, proxy devices, and/or the like.

The plurality of client devices 104a-d may comprise any type of computing device, such as a mobile device, a tablet device, laptop, a desktop computer, a smart television, or other smart device (e.g., smart watch, smart speaker), digital streaming device, robot, and/or the like. The plurality of client devices 104 may be associated with one or more users. A single user may use one or more of the plurality of client devices 104 to access the cloud network 102. The plurality of client devices 104 may travel to a variety of locations and use different networks to access the cloud network 102.

The cloud network 102 may comprise a plurality of computing nodes 106. The plurality of computing nodes 106 may be implemented as one or more computing devices, one or more processors, one or more virtual computing instances, a combination thereof, and/or the like. The plurality of computing nodes 106 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of computing nodes 106 may host a variety of services. In an embodiment, the nodes 106 host a service 108, such as a DWTS service. The service 108 and/or the client devices 104a-d may comprise a wavetable generation model 110 and an audio synthesis system 112.

The wavetable generation model 110 may be configured to perform wavetable generation tasks from a dataset of sounds. The dataset of sounds may comprise any sound that may be input to the wavetable generation model 110. In one embodiment, the dataset of sounds may be a subset of the NSynth dataset which contains 70,000 mono 16 kHz examples, each 4 seconds long. Most of the examples of the NSynth dataset comprise strings, brass, woodwinds and mallets. The sound with a frequency of 16 kHz and a wavetable length of 512 nm may be enough to represent all harmonics of interest. In another embodiment, the sounds may be captured by users associated with client devices 104a-d. For instance, the sound may be a speech fragment captured by a user associated with the client device 104a. To capture the sound, the user may give the application permission to access an audio capture device (e.g., a microphone) of the client device 104a. In other embodiments, the sounds may be audios that have been pre-stored in client computing devices or server computing devices. For instance, the sound may be a song snippet which has been pre-stored in the client device 104a. The dataset of sounds may be stored in one or more databases. A plurality of features may be extracted from the dataset of sounds. The plurality of features may comprise loudness, fundamental frequency, and timbre embedding of the input sound. The extracted features may be input to the wavetable generation model 110.

The wavetable generation model 110 may be trained to generate and output a plurality of wavetables. The wavetable generation model 110 may be trained using a gradient descent algorithm with a plurality of learnable parameters, such as variable numbers of wavetables and wavetable lengths. After trained, the wavetable generation model 110 may be configured to generate and output a plurality of wavetables, as well as linear attention and amplitudes of the plurality of wavetables. A frequency-dependent anti-aliasing filter may be applied to the plurality of wavetables. Each of the plurality of wavetables may comprise a waveform associated with a unique timbre. The plurality of wavetables may be portable to other audio-related tasks. The plurality of wavetables may be ordered based on their respective average attention weights. The plurality of wavetables may enable to reduce a number of control dimensions of audio synthesis. The plurality of wavetables may form an explicit dictionary that may be stored in one or more databases. The output of the wavetable generation model 110 may be used by the audio synthesis system 112 for audio synthesis.

The audio synthesis system 112 may be configured to perform audio synthesis tasks based at least in part on a plurality of wavetables (e.g., those wavetables generated by the wavetable generation model 110). In some embodiments, the audio synthesis system 112 may be configured to produce a synthesized audio based on timbre vector, specified time-varying vectors, and at least one subset of the plurality of wavetables. The specified time-varying vectors may comprise loudness and fundamental frequency. For an example, a piece of new music, such as a flute snippet, may be produced by the audio synthesis system 112 using some generated wavetables and specified vectors. For another example, a song clip sung by a person may be produced by the audio synthesis system 112 based on other generated wavetables and certain specified vectors. The synthesized audio may be stored in one or more databases.

In other embodiments, the audio synthesis system 112 may produce a synthesized audio based on a new machine learning model and at least one subset of the plurality of wavetables (e.g., those wavetables generated by the wavetable generation model 110). The new machine learning model may be CPU (Central Processing Unit)-friendly. The machine learning model may be configured to reduce computational complexity of audio synthesis. For example, the machine learning model may be pre-trained to learn output only data indicative of a linear combination of the wavetables, thereby reducing computational complexity of audio synthesis.

In another example, the audio synthesis system 112 may produce a synthesized audio based on a one-shot learning model and at least one subset of the plurality of wavetables (e.g., those wavetables generated by the wavetable generation model 110). The one-shot learning model may be CPU friendly. The one-shot learning model may be initialized with the plurality of wavetables (e.g., those wavetables generated by the wavetable generation model 110). The one-shot learning model may be trained on a single snippet of new audio, for example, a single 4-second passage of saxophone from the URMP dataset. The one-shot learning model may be configured to reduce computational complexity of audio synthesis. The one-shot learning model may perform pitch shifting in response to determining that a loudness feature or a fundamental frequency is changed. The one-shot learning model may output only time-varying attention weights associated with the wavetables to the audio synthesis system 112. For instance, when an original input sound is a piece of violin snippet from the NSynth dataset, the synthesized audio may be a piece of new music. The piece of new music may correspond to the original violin snippet. The synthesized audio may be stored in one or more databases.

The service 108 may further comprise a content streaming service which is not shown in FIG. 1. For example, the content streaming service may be an Internet protocol audio streaming service. The service 108 may be configured to distribute content via a variety of transmission techniques. The service 108 may be configured to provide the content, such as audio, video, and/or the like. The content may comprise content streams (e.g., audio stream), content files (e.g., audio file), and/or other data. The content may be stored in a database. For example, the service 108 may comprise an audio sharing service, an audio hosting platform, a content distribution platform, and/or the like. The service 108 may comprise any other type of service in addition to, or instead of, a content streaming service.

In an embodiment, the service 108 may be provided to the client devices 104a-d via the network 120. If the service 108 comprises a content streaming service, content may be output to different client devices 104 via the network 120. The content may be streamed to the client devices 104. The content stream may be a stream of audio received from the service 108. The plurality of client devices 104 may be configured to access the content from the service 108.

In some embodiments, the client devices 104 may further comprise an application for creating content (not shown in FIG. 1). A user may use the application on a client device 104 to create content (e.g., audio and video) and upload the content to the cloud network 102. The client devices 104 may access an interface of the application. The interface may comprise an input element. For example, the input element may be configured to allow users to input the content. To input the content, the user may give the application permission to access an audio capture device, such as a microphone of the client device 104. After the user has input the content, the user may use the application to upload the content to the cloud network 102 and/or to save the content locally to the user device 104. The service 108 may store the uploaded content associated with the content in one or more databases.

It should be appreciated that FIG. 1 is merely illustrative and that other implementations might be utilized. For instance, the client devices 104a-d, the service 108, or other computing devices may be used singly or in combination to implement techniques of advertising as described in the present disclosure. It should also be appreciated that network topology illustrated in FIG. 1 has been greatly simplified and that many more networks, devices, and databases may be utilized to interconnect various computing systems.

Figure 2:
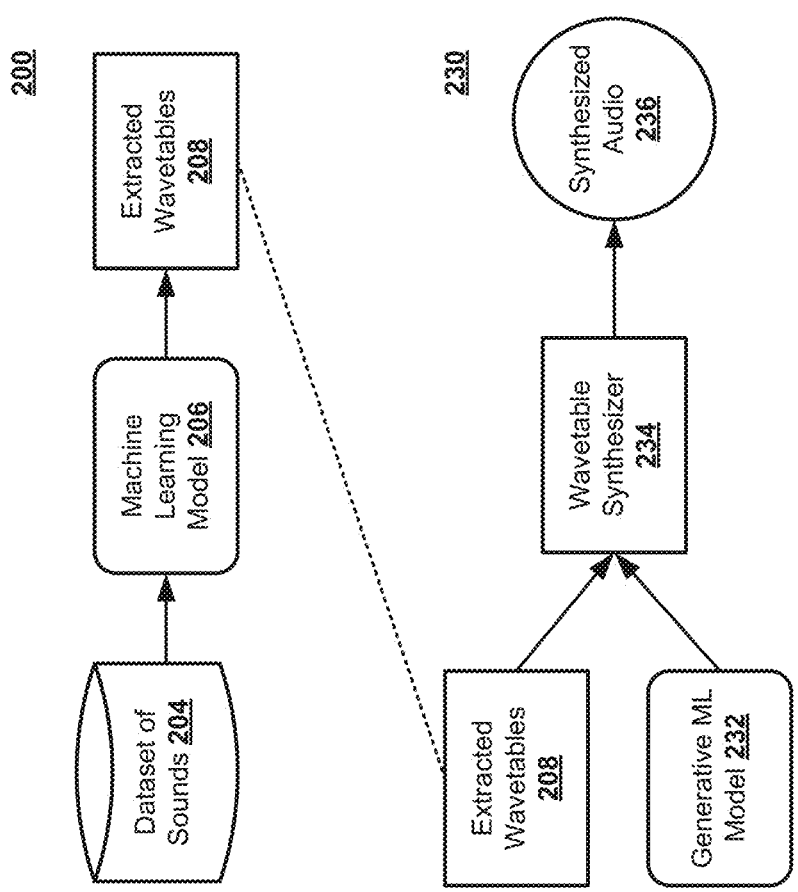
FIG. 2 illustrates an example framework for Differentiable Wavetable Synthesis (DWTS) which may be used in accordance with the present disclosure.

FIG. 2 illustrates example wavetable generation model 200 (e.g., the wavetable generation model 110 as shown in FIG. 1) and example audio synthesis system 230 (e.g., the audio synthesis system 112 as shown in FIG. 1). The wavetable generation model 200 and the audio synthesis system 230 may be used for various audio-related tasks collectively or separately. By way of example and without limitation, the output of the wavetable generation model 200 may be input to the audio synthesis system 230 for synthesizing audio. In other embodiments, the output of the wavetable generation model 200 may be formed as a library of wavetables that can be used to perform various audio-related tasks.

The wavetable generation model 200 may be configured to generate wavetables. Dataset of sounds 204 may be input to a machine learning model 206. The machine learning model 206 may be trained to generate and output a plurality of extracted wavetables 208.

The dataset of sounds 204 may comprise any sound that may be input to the machine learning model 206. In one embodiment, the dataset of sounds 204 may be a subset of the NSynth dataset which contains 70,000 mono 16 kHz examples, each 4 seconds long. Most of the examples of the NSynth dataset comprise strings, brass, woodwinds and mallets. The sound with a frequency of 16 kHz and a wavetable length of 512 nm may be enough to represent all harmonics of interest. In another embodiment, the dataset of sounds 204 may be sound captured by users associated with client devices 104a-d. For instance, the sound may be a speech fragment captured by a user associated with the client device 104a. To capture the sound, the user may give the application permission to access an audio capture device (e.g., a microphone) of the client device 104a. In other embodiments, the dataset of sounds 204 may be sounds that have been pre-stored in client computing devices or server computing devices. For instance, the sound may be a song snippet which has been pre-stored in the client device 104a. The dataset of sounds 204 may be stored in one or more databases.

A plurality of features may be extracted from the dataset of sounds 204 and input to the machine learning model 206. The plurality of features may comprise loudness, fundamental frequency, timbre embedding and other time-varying features of the input dataset of sounds 204. The machine learning model 206 may be setup in an autoencoder configuration. The machine learning model 206 may output jointly extracted wavetables 208, linear attention and amplitude of the extracted wavetables.

The machine learning model 206 may adopt an input tuple $(f_0(n), l(n), z(n))$, wherein $f_0(n)$ is fundamental frequency, $l(n)$ is loudness, and $z(n)$ is residual embedding. Fundamental frequency $f_0(n)$ may be extracted by a pretrained Convolutional Representation for Pitch Estimation (CREPE) model with fixed weights. Loudness $l(n)$ is an A-weighted log-magnitude extracted deterministically from audio. The residual embedding $z(n)$ may be extracted from Mel Frequency Cepstral Coefficients (MFCCs) via an encoder. In addition, wavetable $w_t$ may be randomly initialized with a zero-centered Gaussian distribution N (0, $\sigma^2$). Using a small $\sigma$, for example 0.01, may improve training dynamics.

The machine learning model 206 may be trained to generate and output a plurality of extracted wavetables 208. The machine learning model 206 may be trained using a gradient descent algorithm with a plurality of N×L learnable parameters. N represents a number of wavetables and L represents a wavetable length. For example, the number of wavetables N may be 5, 10, 20, 100, and so on. The wavetable length L may be chosen from 512 nm-2048 nm or other wavetable lengths depending on the needs of use.

Compared to the Differentiable Digital Signal Processing (DDSP), additional N×L learnable parameters may be contained in the learnable dictionary D during training. After the machine learning model 206 is trained, the learnable dictionary D may be frozen, and the parameter counts virtually equal.

After trained, the machine learning model 206 may be configured to generate and output a plurality of extracted wavetables 208. Besides extracted wavetables, the machine learning model 206 may also output linear attention and amplitudes of the extracted wavetables. The machine learning model 206 may draw wavetables directly in time domain. Phase relationships within and across wavetables may be controlled without needing to coherently manage independent magnitudes and phases in the complex frequency domain.

Figure 3:
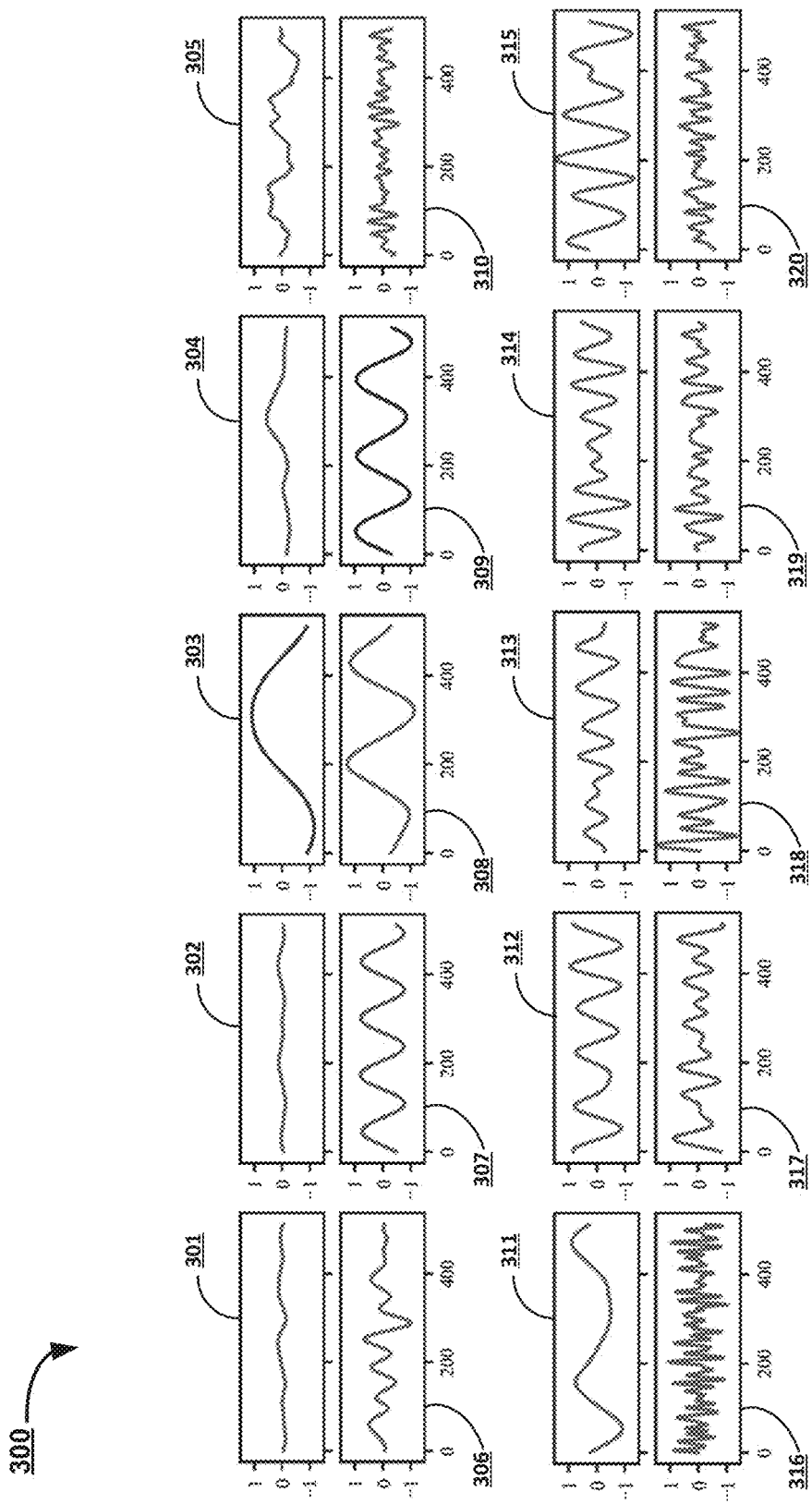
FIG. 3 illustrates example wavetables which may be implemented in accordance with the present disclosure.

Each of the plurality of extracted wavetables 208 may comprise a wavetable which is associated with a unique timbre. The extracted wavetables 208 may be portable to other audio-related tasks. For example, a plurality of wavetables, which are extracted from a piece of pop music, may be portable and be used to synthesize a piece of rock music. The extracted wavetables 208 may be ordered based on their respective average attention weights. For example, as shown in FIG. 3, twenty learned wavetables are ordered with highest average attention weights appearing first. The extracted wavetables 208 may enable to reduce a number of control dimensions of audio synthesis. Compared to DDSP which uses 100 sinusoids, the wavetables approaches may use only 10 wavetables for synthesizing audio. Therefore, the wavetables approaches have much lower computational complexity.

The extracted wavetables 208 may form an explicit learned dictionary D that may be stored in one or more databases. For example, a learned dictionary D may be defined as:

$$D=\{w_i\}_i^N, \quad \text{Equation 1}$$

wherein $w_i$ is a wavetable and N is the number of wavetables. $w_i \in R^L$ denotes a one-cycle wavetable of length L. When a wavetable begins and ends on different values, this discontinuity may cause synthesis artefacts. $w_i[L+1]$ may be appended to $w_i$ and be set to $w_i[0]$, i.e., $w_i[L+1]=w_i[0]$. As a result, a wavetable $w_i$ may contain L+1 elements with L learnable parameters.

The output of the wavetable generation model 200, i.e., the extracted wavetables 208, may be a compact dictionary of one-cycle wavetables. The extracted wavetables 208 may be portable and may be used to perform various audio-related tasks. In one embodiment, the extracted wavetables 208 may be input to the audio synthesis system 230 for synthesizing audio.

The audio synthesis system 230 may be configured to synthesize audio. In one embodiment, the audio synthesis system 230 may synthesize audio using the output of the wavetable generation model 200, i.e., the extracted wavetables 208. In other embodiments, the audio synthesis system 230 may use other portable learned wavetables to produce synthesized audio 236.

The audio synthesis system 230 may be configured to produce synthesized audio 236 based at least in part on the extracted wavetables 208. In some embodiments, the wavetable synthesizer 234 may be configured to produce a synthesized audio 236 based on specified timbre vector and time-varying vectors, and at least one subset of the extracted wavetables 208. The specified time-varying vectors may comprise loudness and fundamental frequency. The extracted wavetables 208 may be generated by the machine learning model 206. For example, a piece of new music, such as a flute snippet, may be produced by the audio synthesis system 230 using some generated wavetables and specified vectors. For another example, a song clip sung by a person may be produced by the audio synthesis system 230 based on other generated wavetables and certain specified vectors.

In other embodiments, the audio synthesis system 230 may produce a synthesized audio based on a generative machine learning (ML) model 232 and at least one subset of the plurality of wavetables (e.g., those wavetables generated by the wavetable generation model 200). The generative ML model 232 may be CPU-friendly. The generative ML model 232 may be configured to reduce computational complexity of audio synthesis. For example, the generative ML model 232 may be pre-trained to learn output only data indicative of a linear combination of the wavetables, thereby reducing computational complexity of audio synthesis.

In another example, the audio synthesis system 230 may produce a synthesized audio based on a one-shot learning model and at least one subset of the plurality of wavetables (e.g., those wavetables generated by the wavetable generation model 200). The one-shot learning model may be CPU friendly. The one-shot learning model may be initialized with the plurality of wavetables (e.g., those wavetables generated by the wavetable generation model 200). The one-shot learning model may be trained on a single snippet of new audio, for example, a single 4-second passage of saxophone from the URMP dataset. The one-shot learning model may be configured to reduce computational complexity of audio synthesis. The one-shot learning model may perform pitch shifting in response to determining that a loudness feature or a fundamental frequency is changed. The one-shot learning model may output only time-varying attention weights associated with the wavetables to the audio synthesis system 230. For instance, when an original input sound is a piece of violin snippet from the NSynth dataset, the synthesized audio may be a piece of new music. The piece of new music may correspond to the original violin snippet.

A phase accumulator may be a dominant element of wavetable synthesizer 234. Given an input sequence of time-varying $f_0(n)$ over discrete time steps n, the instantaneous modulo phase $\tilde{\phi}$ may be computed by integrating $f_0(n)$:

$$\tilde{\phi}(n) = 2\pi \Sigma_{m=0}^n f_0(n) \bmod 2\pi, \quad \text{Equation 2}$$

wherein $\tilde{\phi}(n)$ may be normalized into a fractional index $$J(n) = \frac{L}{2\pi} \tilde{\phi}(n).$$

The signal x(n) may be synthesized by linearly combining wavetables $w_i$ in D via:

$$x(n)=A(n)\Sigma_{i=1}^{N}c_i(n)\cdot\Phi(w_i,\tilde{j}(n),k),\quad\text{Equation 3}$$

wherein A(n) is a time-varying amplitude controlling the signal's overall amplitude and $c_i$ denotes the time-varying attention on $w_i$. A(n) and $c_i(n)$ may be constrained positive via a sigmoid. The function $\Phi(w_i,\tilde{j}(n), k)$ is a fractional indexing operator that returns the (j)-th element of the vector $w_i$ by using an interpolation kernel κ to approximate $w_i[j]$ when $\tilde{j}$ is non-integer. Although there are more sophisticated interpolation kernels (e.g., cubic, spline etc.), linear interpolation is chosen herein to match the real-time use-case optimized for speed.

In the audio synthesis system 230, a frequency-dependent anti-aliasing filter may be applied to the plurality of wavetables. At high $f_0$, certain harmonics contained in a wavetable must be removed before lookup to prevent aliasing. In addition, this filter prevents high harmonics present in initial noise from causing aliasing at the start of training. Without this filter, aliasing artefacts alone cause strong banding in the spectrogram throughout training and prevent any learning.

By sequentially morphing between wavetables, timbre may be changed over time. Morphing may be generalized as a time-varying linear attention over all wavetables, i.e., $c_1^N$, $c_2^N \ldots c_T^N$, wherein N and T are number of wavetables and timesteps respectively with constrains $\Sigma_{i=1}^{N}c_i(n)=1$ and $c_i(n) \geq 0$.

A multi-scale spectral loss may be utilized: $S_i - \hat{S}_i$ $$L_{reconstruction}=\Sigma_i\|S_i-\hat{S}_i\|_1,\quad\text{Equation 4}$$

wherein $S_i$ and $\hat{S}_i$ respectively denote magnitude spectrums of target and synthesized audio, and i denotes different Fast Fourier Transform (FFT) sizes. The log term $\|\log S_i - \log \hat{S}_i\|_1$ was found to cause training instabilities, so it may be excluded. This modification may not influence the quality of synthesized audio.

The original DDSP autoencoder utilizes Deep Neural Networks (DNNs) to control an additive synthesis and filtered noise synthesis to produce harmonic and non-harmonic components of audio respectively. The DWTS uses wavetable synthesis and a filtered noise synthesis identical to DDSP. Noise is a stochastic process with no periodicity, so it must be modelled separately. The optional reverb module may be omitted in the DWTS system.

It should be appreciated that the wavetable synthesis system 200 is merely illustrative and other implementations might be utilized. It should also be appreciated that the functionality disclosed herein may be implemented by one or more servers or computing devices. Additionally, it should be appreciated that the functionality disclosed herein might be implemented in software, hardware or a combination of software and hardware.

FIG. 3 illustrates a plurality of example learned wavetables 300 that may be used by the audio synthesis system, such as the wavetable synthesis system 200 shown in FIG. 2. By way of example and without limitation, the wavetables 300 may comprise twenty waveforms (i.e., N=20) learned from the NSynth dataset. The NSynth dataset comprises about 70,000 audio snippets of musical instruments, each 4-second long. Using a combination of just these twenty wavetables as shown in FIG. 3, the entirety of the NSynth dataset may be reconstructed.

The twenty learned wavetables are ordered with highest average attention weights appearing first. The wavetable 303 is a phase-shifted sinusoid of one period, i.e., the fundamental frequency $f_0$. Wavetables 307 and 309 are other key partials. The remaining wavetables are data-driven combinations of higher harmonics, compactly summarizing in a single wavetable entry what would have taken several sin components to represent. The first two wavetables, i.e., 301 and 302, appear to be silence and could be pruned if desired. Despite being initialized with noise, the learned wavetables 300 are smooth and diverse in shape. Upon inspection, the learned wavetables also match the physics of NSynth sounds. In acoustic instruments, compared to higher harmonics, energy is focused on lower frequencies, particularly the first few harmonics.

Traditionally, wavetables are hand-crafted. In the present disclosure, the machine learning model 206 may be used to learn a set of wavetables (e.g., twenty wavetables shown in FIG. 3). The learned wavetables may accurately describe and reconstruct natural sounds. The learned wavetables may enable other sonic manipulations, for example, high fidelity pitch shifting beyond existing algorithms, enhanced CPU performance, polyphonic playback of learned wavetables, and so on.

Figure 4:
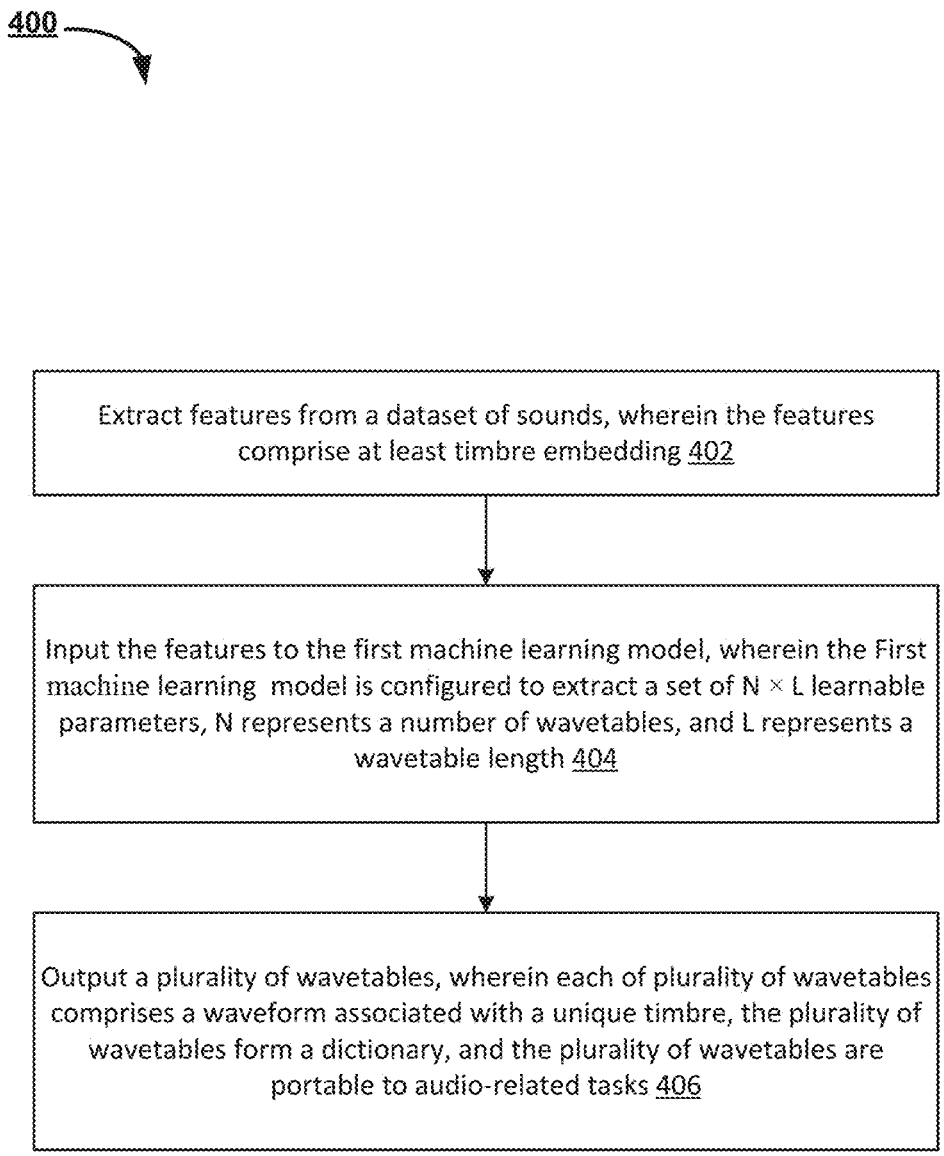
FIG. 4 illustrates an example process for producing audio in accordance with the present disclosure.

FIG. 4 illustrates an example process 400 that may be performed by the wavetable generation model 200 and the audio synthesis system 230 as shown in FIG. 2. Although depicted as a sequence of operations in FIG. 4, those of ordinary skill in the art will appreciate that various embodiments may add, remove, reorder, or modify the depicted operations.

At 402, a plurality of features may be extracted from a dataset of sounds. The plurality of features may comprise amplitude (i.e., loudness), fundamental frequency, and timbre embedding. The dataset of sounds may comprise any sound that may be used to extract wavetables. In one embodiment, the dataset of sounds may be a subset of the NSynth dataset which contains 70,000 mono 16 kHz examples, each 4 seconds long. Most of the examples of the NSynth dataset comprise strings, brass, woodwinds and mallets. The sound with a frequency of 16 kHz and a wavetable length of 512 nm may be enough to represent all harmonics of interest. In another embodiment, the sounds may be captured by users associated with client devices 104a-d. For instance, the sound may be a speech fragment captured by a user associated with the client device 104a. To capture the sound, the user may give the application permission to access an audio capture device (e.g., a microphone) of the client device 104a. In other embodiments, the sounds may be audios that have been pre-stored in the client computing devices or server computing devices. For instance, the sound may be a song snippet which has been stored in the client device 104a. The dataset of sounds may be stored in one or more databases.

At 404, a first machine learning model, such as the machine learning model 206 as shown in FIG. 2, may be configured. The extracted features may be input to the first machine learning model. The first machine learning model may be configured to extract a set of N×L learnable parameters, wherein N represents a number of wavetables, and L represents a wavetable length. In one example, the first machine learning model may be configured using a gradient descent algorithm. The first machine learning model may be setup in an autoencoder configuration. The first machine learning model may output jointly extracted wavetables, linear attention and amplitude of the extracted wavetables. The output may be passed through a wavetable synthesizer to produce the final synthesized audio.

The first machine learning model may adopt an input tuple $(f_0(n), l(n), z(n))$, wherein $f_0(n)$ is fundamental frequency, $l(n)$ is loudness, and $z(n)$ is residual embedding. Fundamental frequency $f_0(n)$ may be extracted by a pre-trained Convolutional Representation for Pitch Estimation (CREPE) model with fixed weights. Loudness $l(n)$ is an A-weighted log-magnitude extracted deterministically from audio. The residual embedding $z(n)$ may be extracted from Mel Frequency Cepstral Coefficients (MFCCs) via an encoder. In addition, wavetable $w_i$ may be randomly initialized with a zero-centered Gaussian distribution $N(0, \sigma^2)$. Using a small $\sigma$, for example 0.01, may improve training dynamics.

The first machine learning model may be trained to extract a plurality of wavetables. The first machine learning model may be trained using a gradient descent algorithm to extract the set of N×L learnable parameters In one example, the number of wavetables N may be 5, 10, 20, 100, and so on. The wavetable length L may be chosen from 512 nm-2048 nm or other wavetable lengths depending on the needs of use. Additional N×L learnable parameters may be contained in the learnable dictionary D during training. After the first machine learning model is trained, the learnable dictionary D may be frozen.

At 406, a plurality of wavetables may be output from the first machine learning model. Each of the plurality of wavetables may comprise a waveform associated with a unique timbre. The plurality of wavetables may form an explicit dictionary. The plurality of wavetables may be portable to audio-related tasks. The plurality of extracted wavetables may form a learnable dictionary D. The learnable dictionary D may be a compact dictionary of one-cycle wavetables. The learnable dictionary D may be portable to other audio-related tasks. In some embodiments, the extracted wavetables may be input to the audio synthesis system 200 for synthesizing audio. In other embodiments, the extracted wavetables may be formed as a library of wavetables that can be used to perform various audio-related tasks. For example, a plurality of wavetables, which are extracted from a piece of pop music, may be portable and be used to synthesize a piece of rock music.

Each of the plurality of extracted wavetables may comprise a waveform which is associated with a unique timbre. The extracted wavetables may be ordered based on their respective average attention weights. For example, as shown in FIG. 3, twenty learned wavetables are ordered with highest average attention weights appearing first. The extracted wavetables may enable to reduce a number of control dimensions of audio synthesis. Compared to DDSP which uses 100 sinusoids, the wavetables approaches may use as few as 10 wavetables for synthesizing audio. Therefore, the wavetables approaches have much lower computational complexity. The first machine learning model may also output a plurality of other features for audio synthesis, such as linear attention, amplitude of wavetables, and so on. Then, the extracted wavetables and other features for audio synthesis may be output to wavetable synthesizer, such as audio synthesis system 230 as shown in FIG. 2, for use of audio synthesis.

An audio item may be produced based at least in part on at least one subset of a plurality of wavetables. A wavetable synthesizer, such as the audio synthesis system 230 as shown in FIG. 2, may be used to perform audio synthesis tasks. In one embodiment, the wavetable synthesizer may be configured to produce a synthesized audio based on specified time-varying timbre vector and at least one subset of a plurality of wavetables. In another embodiment, other vectors may also be specified for produce an audio item based on at least one subset of the plurality of wavetables. The other specified time-varying vectors may comprise loudness and fundamental frequency.

The at least one subset of a plurality of wavetables may be obtained from a dictionary comprising the plurality of wavetables. Each of the plurality of wavetables comprises a waveform associated with a unique timbre. The plurality of wavetables may be extracted and output by the first machine learning model as described above. The plurality of wavetables may enable very efficient polyphony. The plurality of wavetables are known before audio synthesis, therefore, the wavetables may be pre-optimized for real-time use cases, such as pre-antialiasing the wavetables. In other embodiments, synthesized audio items may be produced based on other portable learned wavetables.

For an example, a piece of music, such as a flute snippet, may be produced by the audio synthesis system 112 based at least in part on at least one subset of wavetables obtained from a dictionary comprising a plurality of portable wavetables. For another example, a song clip sung by a person may be produced by the audio synthesis system 112 based at least in part on other wavetables obtained from another dictionary comprising another plurality of portable wavetables. The synthesized audio items may be stored in one or more databases.

Figure 5:
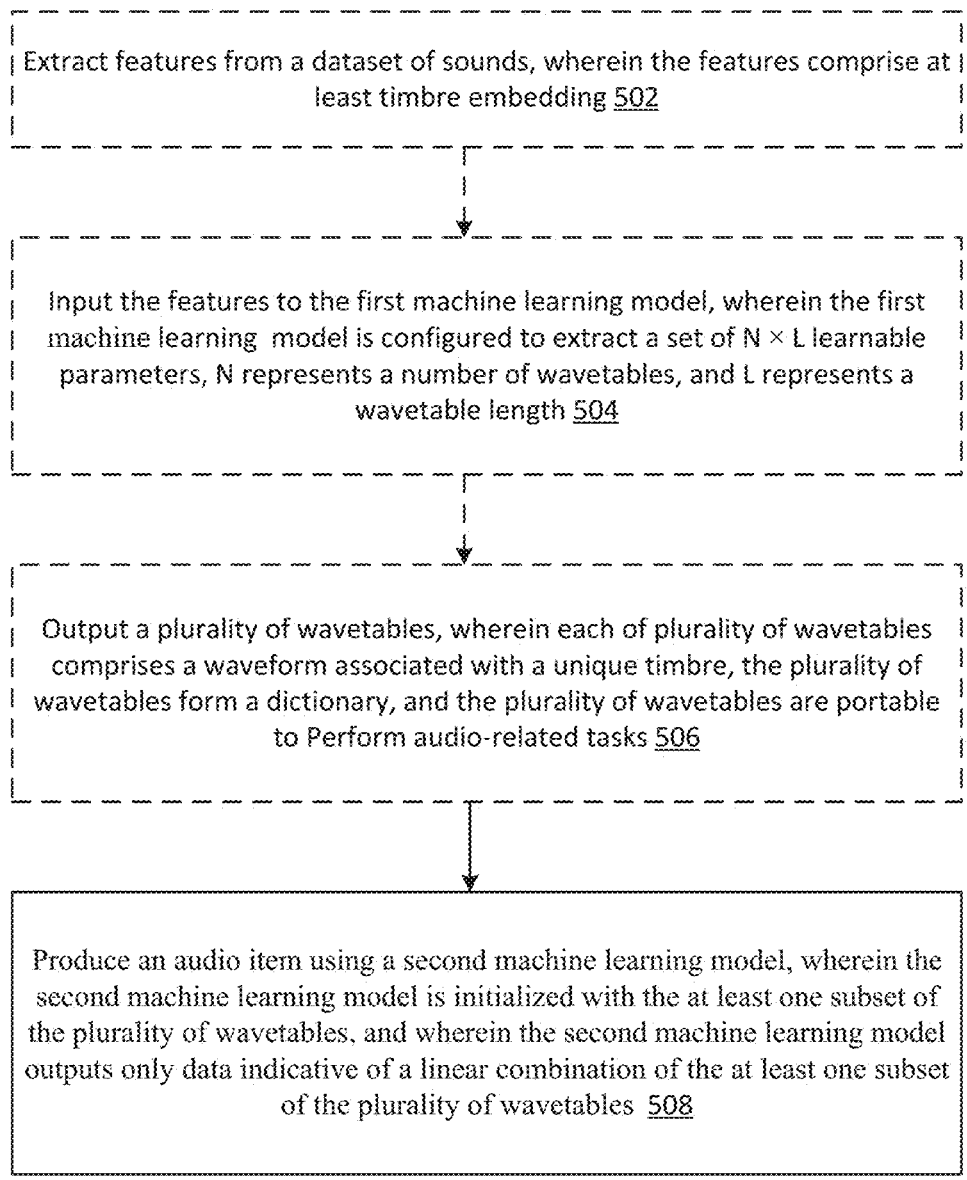
FIG. 5 illustrates an example process for producing audio in accordance with the present disclosure.

FIG. 5 illustrates an example process 500 that may be performed by the wavetable generation model 200 and audio synthesis system 230 as shown in FIG. 2. Although depicted as a sequence of operations in FIG. 5, those of ordinary skill in the art will appreciate that various embodiments may add, remove, reorder, or modify the depicted operations.

At 502, a plurality of features may be extracted from a dataset of sounds. The plurality of features may comprise loudness, fundamental frequency, and timbre embedding. The dataset of sounds may comprise any sound that may be used to extract wavetables. In one embodiment, the dataset of sounds may be a subset of the NSynth dataset which contains 70,000 mono 16 kHz examples, each 4 seconds long. Most of the examples of the NSynth dataset comprise strings, brass, woodwinds and mallets. The sound with a frequency of 16 kHz and a wavetable length of 512 nm may be enough to represent all harmonics of interest. In another embodiment, the sounds may be captured by users associated with client devices 104a-d. For instance, the sound may be a speech fragment captured by a user associated with the client device 104a. To capture the sound, the user may give the application permission to access an audio capture device (e.g., a microphone) of the client device 104a. In other embodiments, the sounds may be audios that have been pre-stored in the client computing devices or server computing devices. For instance, the sound may be a song snippet which has been stored in the client device 104a. The dataset of sounds may be stored in one or more databases.

At 504, a first machine learning model, such as the machine learning model 206 as shown in FIG. 2, may be configured. The extracted features may be input to the first machine learning model. The first machine learning model may configured to extract a set of N×L learnable parameters, wherein N represents a number of wavetables, and L represents a wavetable length. The first machine learning model may be setup in an autoencoder configuration. The first machine learning model may output jointly extracted wavetables, linear attention and amplitude of the extracted wavetables. The output may be passed through a wavetable synthesizer to produce the final synthesized audio.

The first machine learning model may adopt an input tuple $(f_0(n), l(n), z(n))$, wherein $f_0(n)$ is fundamental frequency, l(n) is loudness, and z(n) is residual embedding. Fundamental frequency $f_0(n)$ may be extracted by a pre-trained Convolutional Representation for Pitch Estimation (CREPE) model with fixed weights. Loudness l(n) is an A-weighted log-magnitude extracted deterministically from audio. The residual embedding z(n) may be extracted from Mel Frequency Cepstral Coefficients (MFCCs) via an encoder. In addition, wavetable $w_i$ may be randomly initialized with a zero-centered Gaussian distribution N (0, $\sigma^2$). Using a small $\sigma$, for example 0.01, may improve training dynamics.

At 506, a plurality of wavetables may be output by the trained first machine learning model. Each of the plurality of wavetables may comprise a waveform associated with a unique timbre. The plurality of wavetables may form an explicit dictionary. The plurality of wavetables may be portable to audio-related tasks. The plurality of extracted wavetables may form a learnable dictionary D. The learnable dictionary D may be a compact dictionary of one-cycle wavetables. The learnable dictionary D may be portable to other audio-related tasks. In some embodiments, the extracted wavetables may be input to the audio synthesis system 200 for synthesizing audio. In other embodiments, the extracted wavetables may be formed as a library of wavetables that can be used to perform various audio-related tasks. For example, a plurality of wavetables, which are extracted from a piece of pop music, may be portable and be used to synthesize a piece of rock music.

Each of the plurality of extracted wavetables may comprise a waveform which is associated with a unique timbre. The extracted wavetables may be ordered based on their respective average attention weights. For example, as shown in FIG. 3, twenty learned wavetables are ordered with highest average attention weights appearing first. The extracted wavetables may enable to reduce a number of control dimensions of audio synthesis. The present disclosure enables to use as few as 10 wavetables for synthesizing audio. Therefore, the wavetables approaches in accordance with the present disclosure have much lower computational complexity. The first machine learning model may also output a plurality of other features for audio synthesis, such as linear attention, amplitude of wavetables, and so on. Then, the extracted wavetables and other features for audio synthesis may be output to wavetable synthesizer, such as audio synthesis system 230 as shown in FIG. 2, for use of audio synthesis At 508, an audio item may be produced based on at least one subset of a plurality of wavetables and using a second machine learning model. In some embodiments, the at least one subset of the plurality of wavetables may be output from the first machine learning model. In other embodiments, the at least one subset of the plurality of wavetables may be obtained from a dictionary comprising the plurality of wavetables.

The second machine learning model may be initialized with the at least one subset of the plurality of wavetables. The second machine learning model may be configured to reduce a computational complexity of audio synthesis. The second machine learning model may be CPU-friendly. The second machine learning model may output only data indicative of a linear combination of the at least one subset of the plurality of wavetables. An audio items may be produced based on the linear combination of the at least one subset of the plurality of wavetables.

Figure 6:
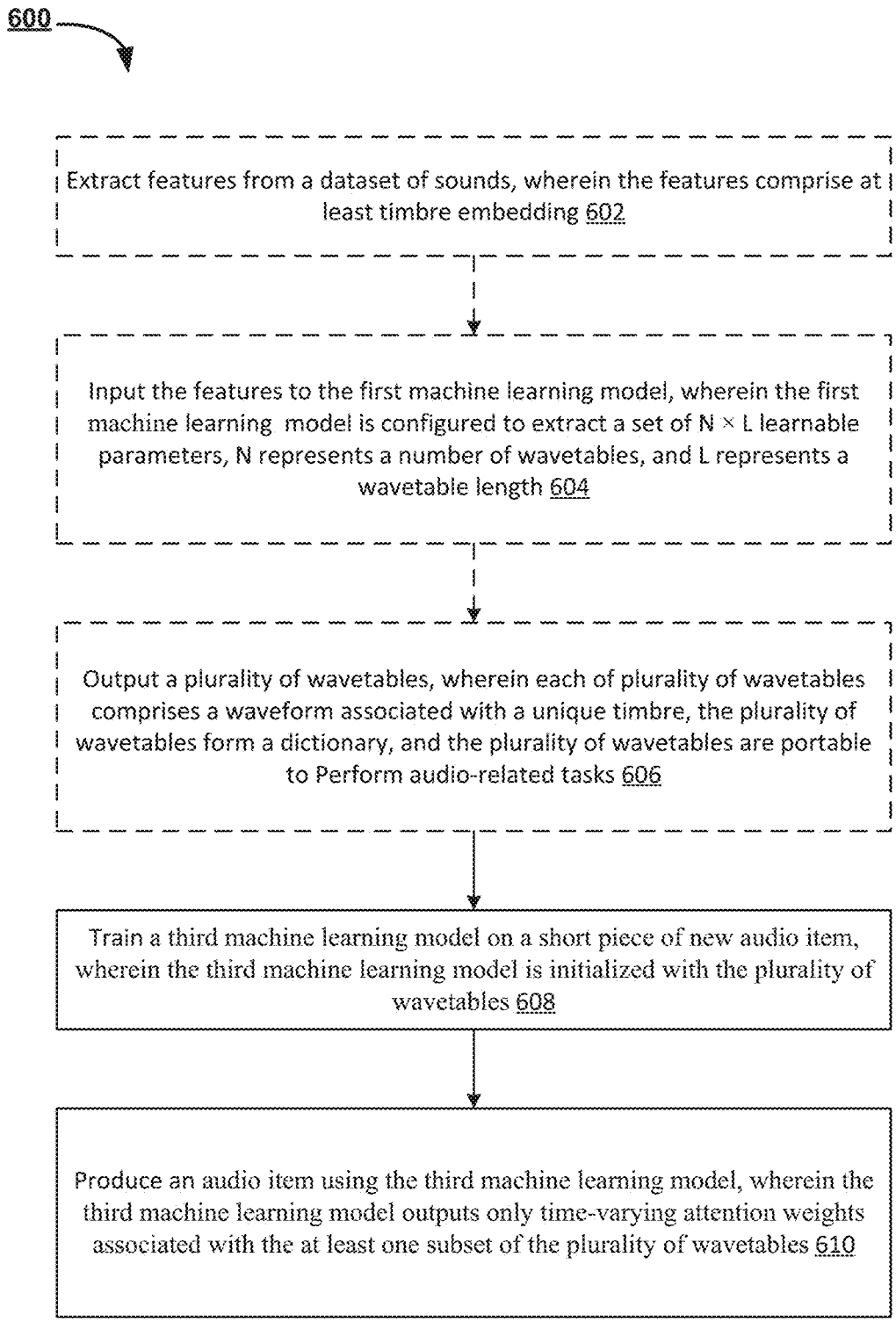
FIG. 6 further illustrates another example process for producing audio in accordance with the present disclosure.

FIG. 6 illustrates an example process 600 that may be performed by the wavetable generation model 200 and audio synthesis system 230 as shown in FIG. 2. Although depicted as a sequence of operations in FIG. 6, those of ordinary skill in the art will appreciate that various embodiments may add, remove, reorder, or modify the depicted operations.

At 602, a plurality of features may be extracted from a dataset of sounds. The plurality of features may comprise loudness, fundamental frequency, and timbre embedding. The dataset of sounds may comprise any sound that may be used to extract wavetables. In one embodiment, the dataset of sounds may be a subset of the NSynth dataset which contains 70,000 mono 16 kHz examples, each 4 seconds long. Most of the examples of the NSynth dataset comprise strings, brass, woodwinds and mallets. The sound with a frequency of 16 kHz and a wavetable length of 512 nm may be enough to represent all harmonics of interest. In another embodiment, the sounds may be captured by users associated with client devices 104*a*-*d*. For instance, the sound may be a speech fragment captured by a user associated with the client device 104*a*. To capture the sound, the user may give the application permission to access an audio capture device (e.g., a microphone) of the client device 104*a*. In other embodiments, the sounds may be audios that have been pre-stored in the client computing devices or server computing devices. For instance, the sound may be a song snippet which has been stored in the client device 104*a*. The dataset of sounds may be stored in one or more databases.

At 604, a first machine learning model, such as the machine learning model 206 as shown in FIG. 2, may be configured. The extracted features may be input to the first machine learning model. The first machine learning model may be configured to extract a set of N×L learnable parameters, wherein N represents a number of wavetables, and L represents a wavetable length. The first machine learning model may be setup in an autoencoder configuration. The first machine learning model may output jointly extracted wavetables, linear attention and amplitude of the extracted wavetables. The output may be passed through a wavetable synthesizer to produce the final synthesized audio.

The first machine learning model may adopt an input tuple ($f_0(n)$, l(n), z(n)), wherein $f_0(n)$ is fundamental frequency, l(n) is loudness, and z(n) is residual embedding. Fundamental frequency $f_0(n)$ may be extracted by a pre-trained Convolutional Representation for Pitch Estimation (CREPE) model with fixed weights. Loudness l(n) is an A-weighted log-magnitude extracted deterministically from audio. The residual embedding z(n) may be extracted from Mel Frequency Cepstral Coefficients (MFCCs) via an encoder. In addition, wavetable $w_i$ may be randomly initialized with a zero-centered Gaussian distribution N (0, $\sigma^2$). Using a small $\sigma$, for example 0.01, may improve training dynamics.

At 606, a plurality of wavetables may be output by the trained first machine learning model. Each of the plurality of wavetables may comprise a waveform associated with a unique timbre. The plurality of wavetables may form an explicit dictionary. The plurality of wavetables may be portable to audio-related tasks. The plurality of extracted wavetables may form a learnable dictionary D. The learnable dictionary D may be a compact dictionary of one-cycle wavetables. The learnable dictionary D may be portable to other audio-related tasks. In some embodiments, the extracted wavetables may be input to the audio synthesis system 200 for synthesizing audio. In other embodiments, the extracted wavetables may be formed as a library of wavetables that can be used to perform various audio-related tasks. For example, a plurality of wavetables, which are extracted from a piece of pop music, may be portable and be used to synthesize a piece of rock music.

Each of the plurality of extracted wavetables may comprise a waveform which is associated with a unique timbre. The extracted wavetables may be ordered based on their respective average attention weights. For example, as shown in FIG. 3, twenty learned wavetables are ordered with highest average attention weights appearing first. The extracted wavetables may enable to reduce a number of control dimensions of audio synthesis. Compared to conventional audio synthesis techniques which use 100 sinusoids, the present disclosure may enable to use as few as 10 wavetables for synthesizing audio. Therefore, the wavetable approaches as described in the present disclosure have much lower computational complexity.

At 608, a third machine learning model may be trained on a short piece of new audio item. The third machine learning model may be initialized with the plurality of wavetables. In one example, the plurality of wavetables may be the twenty wavetables as shown in FIG. 3. In some embodiments, the plurality of wavetables may be output from the first machine learning model. In other embodiments, the plurality of wavetables may be obtained from a dictionary comprising the plurality of wavetables. The plurality of wavetables may be obtained by a dictionary lookup.

The third machine learning model may be a one-shot machine learning model, such as the generative ML model 232 as shown in FIG. 2. The third machine learning model may be initialized with a plurality of wavetables, such as the twenty learned wavetables as shown in FIG. 3. The third machine learning model may be trained on a short piece of new audio item. By way of example and without limitation, the short piece of audio item may have a duration of one-second, four-second, or one-minute. In one example, the short piece of music may be a four-second passage of saxophone music from the URMP dataset.

At 610, an audio item may be produced using the third machine learning model. The third machine learning model may be configured to reduce a computational complexity of audio synthesis. The third machine learning model may be CPU-friendly. The third machine learning model may output only time-varying attention weights associated with the at least one subset of the plurality of wavetables. An audio item may be produced based on the time-varying attention weights associated with the at least one subset of the plurality of wavetables.

Figure 10:
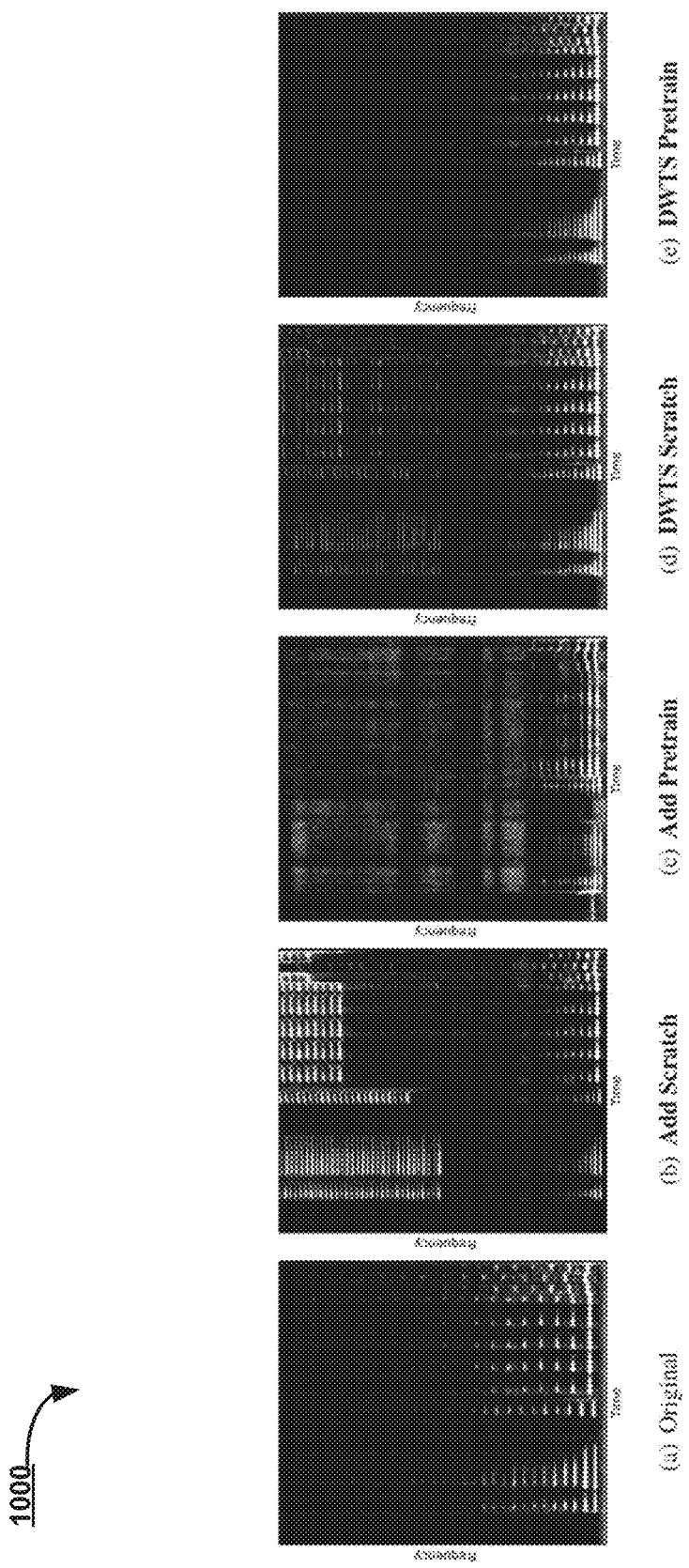
FIG. 10 illustrates example spectrograms of original audio and synthesized samples using varying models.

The third machine learning model may perform pitch shifting in response to determining that a loudness feature or a fundamental frequency is changed. For example, as shown in FIG. 10, synthesis using the third machine learning model (DWTS Pretrain) is robust to overfitting during extrapolation. The synthesis using the third machine learning model also may remain artefact free even at extreme shifts, such as three octaves below the original sample. In other embodiments, synthesized audio items may be produced based on other portable learned wavetables.

Figure 7:
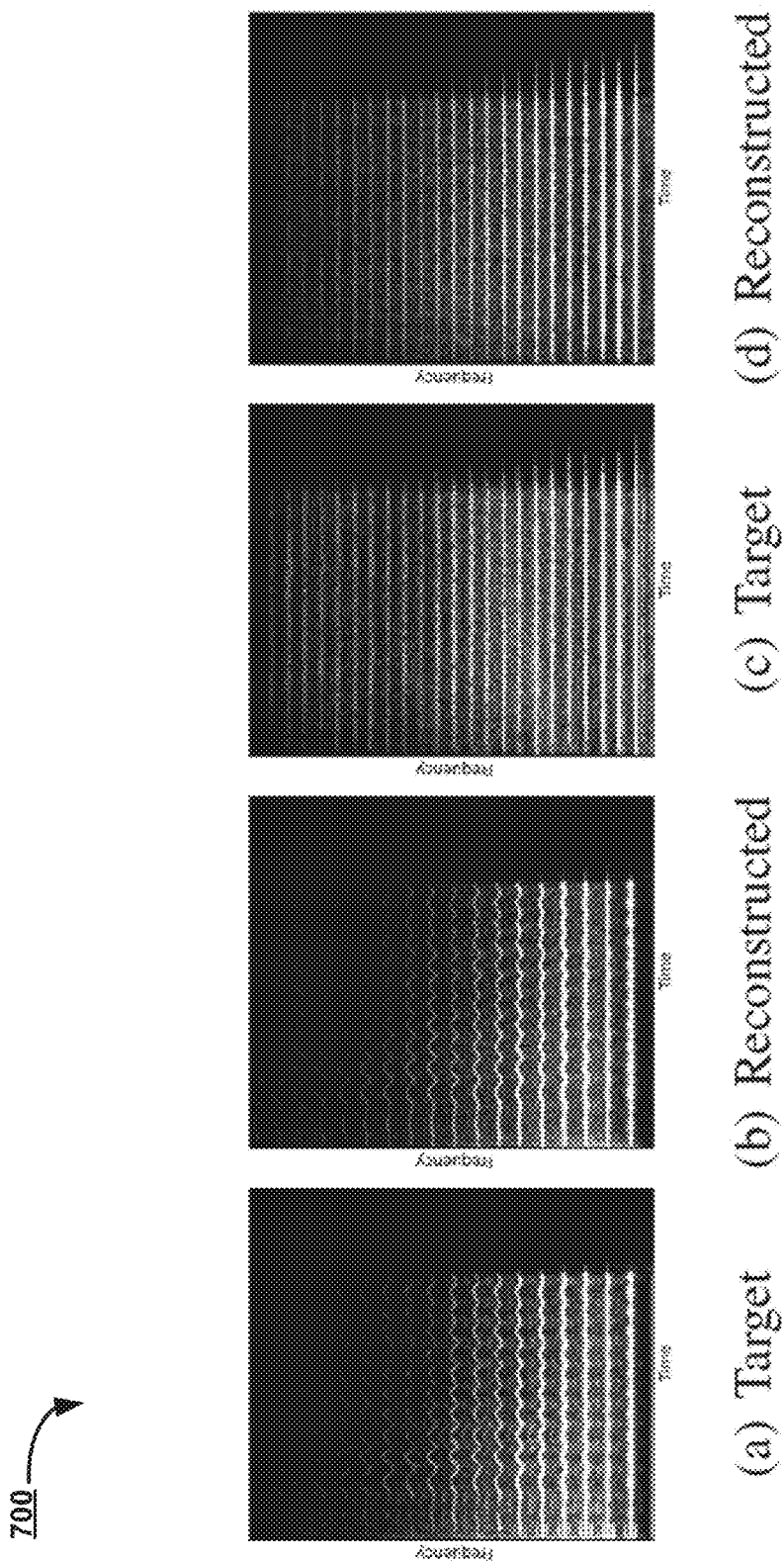
FIG. 7 illustrates example spectrograms associated with audio samples in accordance with the present disclosure.

FIG. 7 illustrates example spectrograms of two target samples and their corresponding reconstruction. The reconstruction was implemented using the DWTS provided by the present disclosure. FIG. 7 shows that the DWTS has a high-quality performance in reconstruction.

FIG. 8 illustrates an example reconstruction error comparison on the Nsynth dataset. Compared to the state-of-the-art (SOTA) additive synthesis approach, the DWTS approach achieves comparable or lower errors. FIG. 8 shows the reconstruction error of the SOTA additive-based autoencoder from DDSP 802 and the proposed DWTS-based autoencoder 804. In the DWTS approach, the number of wavetables N may be 5, 10, 20, 100. The DWTS approach achieves the lowest reconstruction error of 0.5712 using only twenty wavetables (i.e., N=20). At the expense of a small reduction in quality compared to the baseline, the number of wavetables N may be as low as ten (i.e., N=10).

The wavetables in dictionary D may form an alternative, compact set of basis vectors spanning an L-dimensional space extracted directly from the data. When N is very small, such as 5, reconstruction suffers due to an insufficient number of bases. When the number of wavetables is 10-20, an optimal balance for the NSynth dataset may be achieved. Compared to the 100 sinusoids in DDSP, wavetables are advantageous as they reduce the number of control dimensions by an order of magnitude. More importantly, the extracted wavetables may form an explicit dictionary that are portable to other tasks. For example, a plurality of wavetables, which are extracted from a piece of pop music, may be portable and be used to synthesize a piece of rock music.

Figure 9:
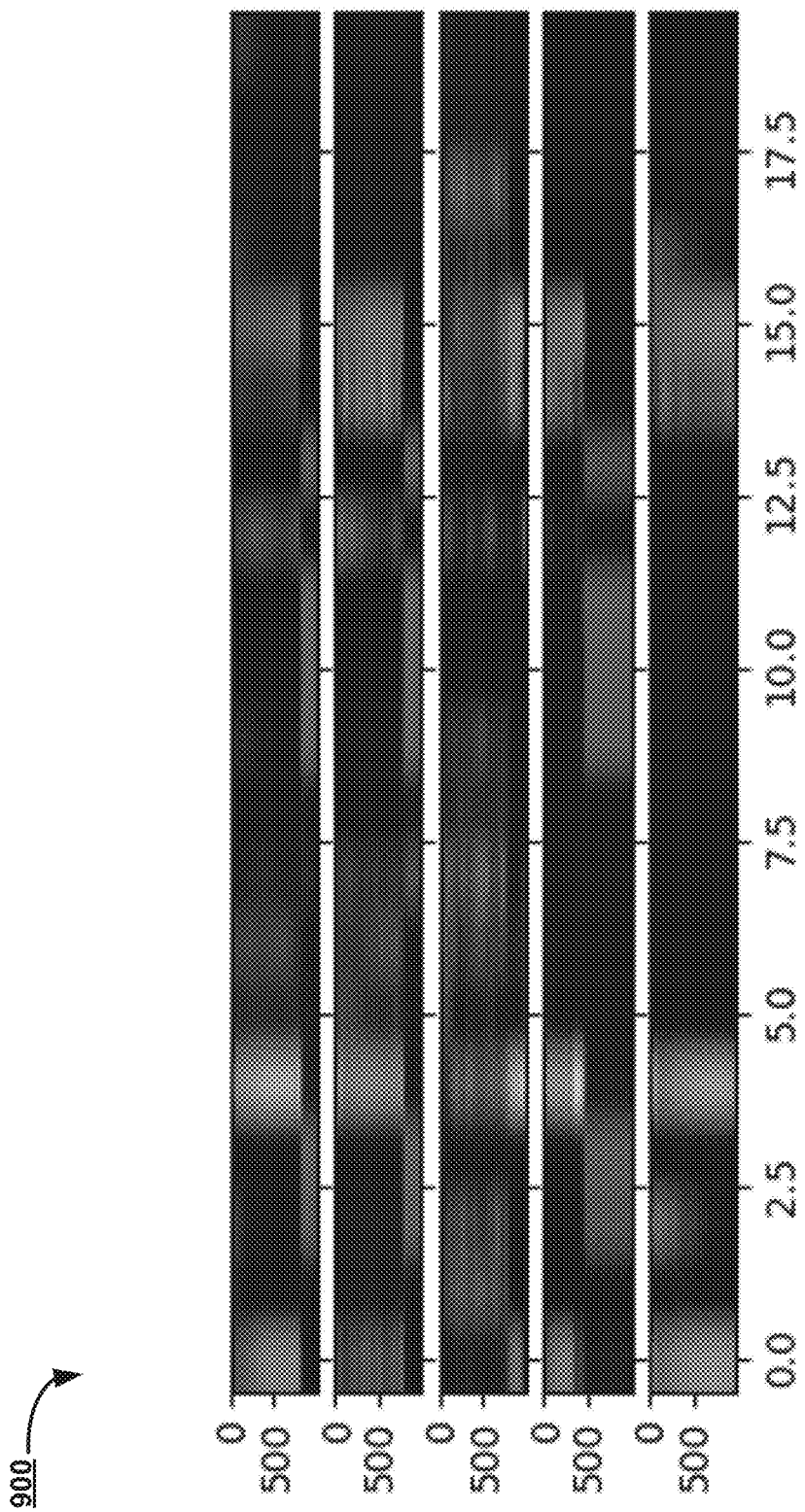
FIG. 9 illustrates examples depicting the visualization of attention weights of different samples.

FIG. 9 illustrates examples depicting visualization of time-varying attention weights of different samples. Five audio samples are shown individually at each subplot. The attention visibly shifts across wavetables over time to output the desired spectrum. The asymmetric wavetables are the result of complex behavior in magnitude and phase. When phase-locking wavetables to 0 (i.e., all wavetables start and end at 0), it may significantly deteriorate performance. The model may be suggested to take advantage of phase relationships within and between wavetables. This precise control of wavetable phase may be particularly valuable for exploring synthesis of stereo and binaural audio.

FIG. 10 shows example spectrograms comparison of original audio and synthesized samples from an input $f_0(n)$ pitch shifted down by an octave. The comparison is implemented among the original audio and audios produced by four models, i.e., Add Scratch, Add Pretrain, DWTS Scratch, and DWTS Pretrain. The Add Scratch stands for additive-synth autoencoder trained from scratch. The Add Pretrain stands for finetuning an additive-synth autoencoder pre-trained on Nsynth. The DWTS Scratch stands for wavetable-synth autoencoder pretrained from scratch. The DWTS Pretrain stands for wavetable-synth autoencoder using one-shot learning. The DWTS Pretrain may only output time-varying attention weights.

A single 4-second passage of saxophone from the URMP dataset may be used for the comparison. In FIG. 10, Add Scratch, Add Pretrain, and DWTS Scratch are three baselines. The three baselines may be used to compare with DWTS Pretrain. FIG. 10 shows that all the three baselines exhibit high frequency artefacts when input $f_0(n)$ is shifted. On the contrary, the DWTS Pretrain remains artefact free even at extreme shifts, such as 3 octaves below the original sample. Although all the three baselines and the DWTS Pretrain achieve identical and high-quality reconstructions of the saxophone segment, only DWTS Pretrain's synthesis is robust to over-fitting during extrapolation.

In one embodiment, a 4-second plano passage may be used for the comparison. A plano is challenging to model due to the presence of both many harmonics and percussive hammer hits. In addition to the three baselines mentioned above, the comparison may use commercial pitch shifting algorithms based on Overlap-And-Add (OLA) methods. When resynthesizing the segment 3 octaves down, DWTS Pretrain is the only method that both preserves the hammer's percussive impact and independently shifts harmonic components. The commercial algorithm loses the transient impact completely due to overlapping windows being stretched.

In another embodiment, the DWTS Pretrain approaches may use an optimal Pitch Synchronous Overlap and Add (PSOLA) algorithm. The PSOLA algorithm attempts to window a single cycle of the original waveform, re-patch and overlap these windows at the new pitch. Artefacts are caused by inherent imperfections in windowing and overlapping segments. In contrast, DWTS Pretrain guarantees single-cycle waveforms in the dictionary $\bar{D}$. Re-pitching is trivially a slower phase accumulator $\bar{\phi}(n)$ reading through a wavetable $w_i$. This may be used for data-efficient neural sampling, pitch auto-tuning and re-shifting.

Figure 11:
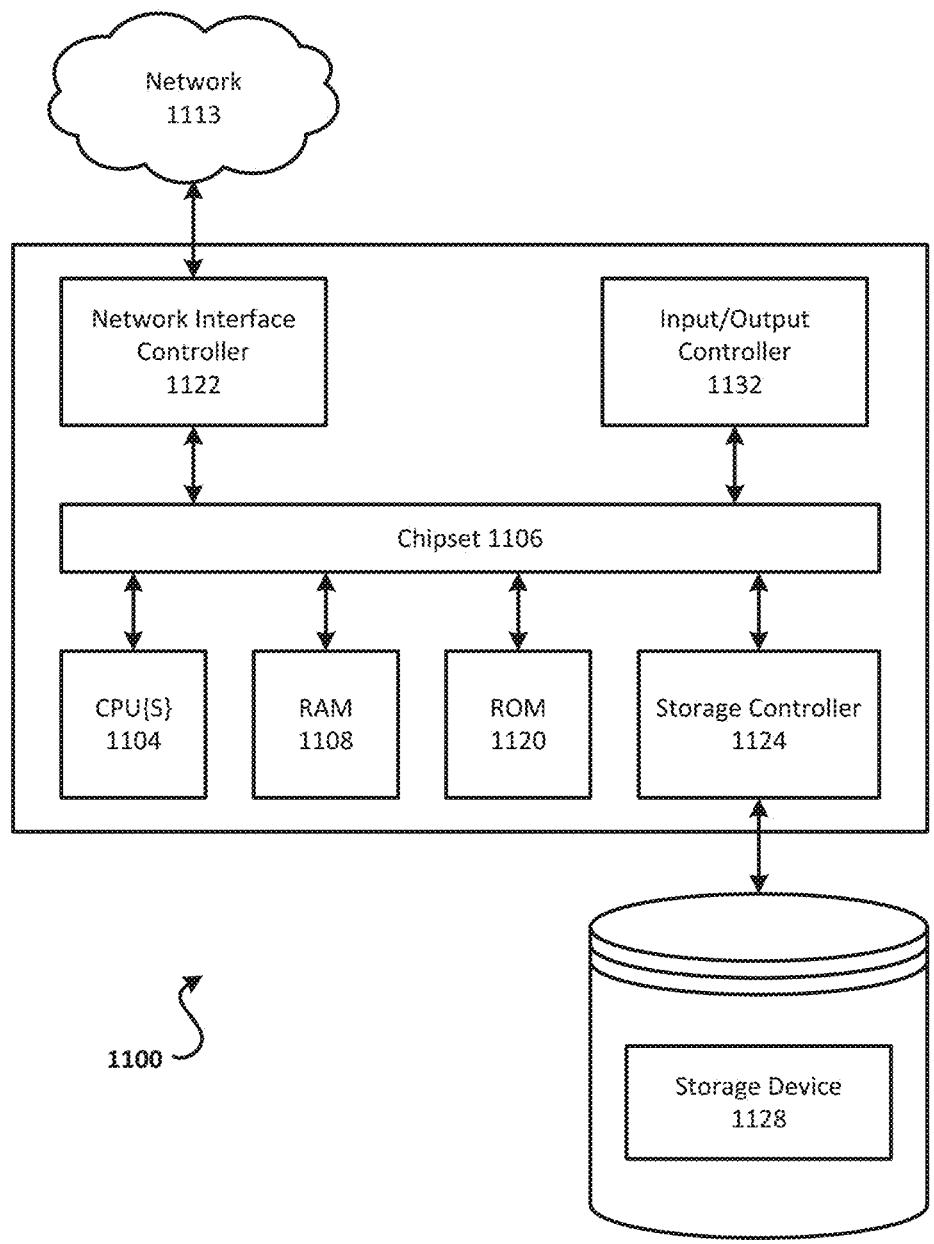
FIG. 11 illustrates an example computing device that may be used in accordance with the present disclosure.

FIG. 11 depicts a computing device that may be used in various aspects. With regard to the example environment of FIG. 1, one or more of services 108 or client devices 104 may be implemented in an instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described in the present disclosure.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s). The GPU(s) may comprise processing units specialized for but not necessarily limited to highly parallel computations, such as graphics and other visualization-related processing.

A user interface may be provided between the CPU(s) 1104 and the remainder of the components and devices on the baseboard. The interface may be used to access a random access memory (RAM) 1108 used as the main memory in the computing device 1100. The interface may be used to access a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein. The user interface may be provided by a one or more electrical components such as the chipset 1106.

The computing device 1100 may operate in a networked environment using logical connections to remote computing nodes and computer systems through local area network (LAN). The chipset 1106 may include functionality for providing network connectivity through a network interface controller (NIC) 1122, such as a gigabit Ethernet adapter. A NIC 1122 may be capable of connecting the computing device 1100 to other computing nodes over a network 1113. It should be appreciated that multiple NICs 1122 may be present in the computing device 1100, connecting the computing device to other types of networks and remote computer systems.

The computing device 1100 may be connected to a storage device 1128 that provides non-volatile storage for the computer. The storage device 1128 may store system programs, application programs, other program modules, and data, which have been described in greater detail herein. The storage device 1128 may be connected to the computing device 1100 through a storage controller 1124 connected to the chipset 1106. The storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 1128 is characterized as primary or secondary storage and the like.

For example, the computing device 1100 may store information to the storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may read information from the storage device 1128 by detecting the physical states or characteristics of one or more particular locations within the physical storage units.

In addition or alternatively to the storage device 1128 described herein, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 1128 may store other system or application programs and data utilized by the computing device 1100.

The storage device 1128 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 1100 by specifying how the CPU(s) 1104 transition between states, as described herein. The computing device 1100 may have access to computer-readable storage media storing computer-executable instructions, which, when executed by the computing device 1100, may perform the methods described in the present disclosure.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information, and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   extracting features from a dataset of sounds, wherein the features comprise at least timbre embedding;
   inputting the features to a first machine learning model;
   generating a plurality of wavetables by the first machine learning model based on the features, wherein each of plurality of wavetables comprises a waveform associated with a unique timbre;
   initializing another machine learning model with at least one subset of the plurality of wavetables, wherein the another machine learning model is configured to reduce a computational complexity of audio synthesis; and
   generating an audio item based on data output from the another machine learning model.

2. The method of claim 1, further comprising:
   producing an audio item based at least in part on at least one subset of the plurality of wavetables.

3. The method of claim 2, wherein the another machine learning model comprises a third machine learning model, and wherein the method further comprises:
   training the third machine learning model on a short piece of new audio item, wherein the third machine learning model is initialized with the plurality of wavetables.

4. The method of claim 3, further comprising:
producing the audio item using the third machine learning model, wherein the third machine learning model outputs only time-varying attention weights associated with the at least one subset of the plurality of wavetables.

5. The method of claim 2, further comprising:
specifying a time-varying timbre vector; and
producing the audio item based on the specified time-varying timbre vector and the at least one subset of the plurality of wavetables.

6. The method of claim 2, wherein the another machine learning model comprises a second machine learning model, and wherein the method further comprises:
producing the audio item using the second machine learning model, wherein the second machine learning model is initialized with the at least one subset of the plurality of wavetables, and wherein the second machine learning model outputs only data indicative of a linear combination of the at least one subset of the plurality of wavetables.

7. The method of claim 1, wherein the first machine learning model outputs the plurality of wavetables, linear attentions and amplitudes of the plurality of wavetables.

8. The method of claim 1, wherein the plurality of wavetables enable to reduce a number of control dimensions of audio synthesis.

9. A method, comprising:
obtaining at least one subset of a plurality of wavetables, wherein each of the plurality of wavetables comprises a waveform associated with a unique timbre, wherein the plurality of wavetables are generated by a first machine learning model based on input features, and wherein the input features comprise at least timbre embedding extracted from a dataset of sounds;
initializing another machine learning model with the at least one subset of the plurality of wavetables, wherein the another machine learning model is configured to reduce a computational complexity of audio synthesis; and
producing an audio item based on data output from the another machine learning model.

10. A system, comprising:
at least one processor; and
at least one memory communicatively coupled to the at least one processor and storing instructions that upon execution by the at least one processor cause the system to perform operations, the operations comprising:
extracting features from a dataset of sounds, wherein the features comprise at least timbre embedding;
input the features to a first machine learning model;
generating a plurality of wavetables by the first machine learning model based on the features, wherein each of plurality of wavetables comprises a waveform associated with a unique timbre;
initializing another machine learning model with at least one subset of the plurality of wavetables, wherein the another machine learning model is configured to reduce a computational complexity of audio synthesis; and
generating an audio item based on data output from the another machine learning model.

11. The system of claim 10, the operations further comprising:
producing an audio item based at least in part on at least one subset of the plurality of wavetables.

12. The system of claim 11, wherein the another machine learning model comprises a third machine learning model, and wherein the operations further comprise:
training the third machine learning model on a short piece of new audio item, wherein the third machine learning model is initialized with the plurality of wavetables.

13. The system of claim 12, the operations further comprising:
producing the audio item using the third machine learning model, wherein the third machine learning model outputs only time-varying attention weights associated with the at least one subset of the plurality of wavetables.

14. The system of claim 11, the operations further comprising:
specifying a time-varying timbre vector; and
producing the audio item based on the specified a time-varying timbre vector and the at least one subset of the plurality of wavetables.

15. The system of claim 11, wherein the another machine learning model comprises a second machine learning model, and wherein the operations further comprise:
producing the audio item using the second machine learning model, wherein the second machine learning model is initialized with the at least one subset of the plurality of wavetables, and wherein outputs only data indicative of a linear combination of the at least one subset of the plurality of wavetables.

16. The system of claim 11, wherein the plurality of wavetables enable to reduce a number of control dimensions of audio synthesis.

17. A non-transitory computer-readable storage medium, storing computer-readable instructions that upon execution by a processor cause the processor to implement operations, the operation comprising:
extracting features from a dataset of sounds, wherein the features comprise at least timbre embedding;
input the features to a first machine learning model;
generating a plurality of wavetables by the first machine learning model based on the features, wherein each of plurality of wavetables comprises a waveform associated with a unique timbre;
initializing another machine learning model with at least one subset of the plurality of wavetables, wherein the another machine learning model is configured to reduce a computational complexity of audio synthesis; and
generating an audio item based on data output from the another machine learning model.

18. The non-transitory computer-readable storage medium of claim 17, the operations further comprising:
producing an audio item based at least in part on at least one subset of the plurality of wavetables.

19. The non-transitory computer-readable storage medium of claim 18, wherein the another machine learning model comprises a second machine learning model, wherein the operations further comprise:
producing the audio item using the second machine learning model, wherein the second machine learning model is initialized with the at least one subset of the plurality of wavetables, and wherein the second machine learning model outputs only data indicative of a linear combination of the at least one subset of the plurality of wavetables.

20. The non-transitory computer-readable storage medium of claim 18, wherein the another machine learning model comprises a third machine learning model, wherein the operations further comprise:

training the third machine learning model on a short piece of new audio item, wherein the third machine learning model is initialized with the plurality of wavetables; and producing the audio item using the third machine learning model, wherein the third machine learning model outputs only time-varying attention weights associated with the at least one subset of the plurality of wavetables.

\* \* \* \* \*